United States Patent
Li et al.

(10) Patent No.: US 10,211,732 B2
(45) Date of Patent: Feb. 19, 2019

(54) SWITCHED MODE POWER SUPPLY CIRCUIT FOR AVOIDING EXCESSIVE OUTPUT CURRENT

(71) Applicant: MediaTek Inc., Hsin-Chu (TW)

(72) Inventors: Chih-Chen Li, Taichung (TW); Kuan-Yu Chu, Taipei (TW); Shan-Fong Hong, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 15/240,362

(22) Filed: Aug. 18, 2016

(65) Prior Publication Data

US 2017/0077813 A1    Mar. 16, 2017

Related U.S. Application Data

(60) Provisional application No. 62/218,772, filed on Sep. 15, 2015.

(51) Int. Cl.
*H02M 1/32*     (2007.01)
*H02M 3/158*    (2006.01)
*H02M 1/00*     (2006.01)

(52) U.S. Cl.
CPC ............ *H02M 3/158* (2013.01); *H02M 1/32* (2013.01); *H02M 2001/0009* (2013.01)

(58) Field of Classification Search
CPC . H02M 2001/0009; H02M 1/32; H02M 3/158
See application file for complete search history.

(56) References Cited

U.S. PATENT DOCUMENTS

| 7,948,729 B2 | 5/2011 | Zhang et al. | |
|---|---|---|---|
| 2009/0174485 A1* | 7/2009 | Teng | H03F 1/523 330/298 |
| 2011/0050185 A1* | 3/2011 | Notman | H02M 3/1588 323/271 |

(Continued)

OTHER PUBLICATIONS

"TPS544x20 4.5-V to 18-V, 20-A, and 30-A SWIFT™ Synchronous Buck Converters with PMBus™" Datasheet, Texas Instruments, May 2014.*

(Continued)

*Primary Examiner* — Jue Zhang
*Assistant Examiner* — Jye-June Lee
(74) *Attorney, Agent, or Firm* — Wolf, Greenfield & Sacks, P.C.

(57) ABSTRACT

An SMPS (Switched Mode Power Supply) circuit includes a first switch element, a second switch element, an inductor, a capacitor, a current sensor, a current comparator, and a controller. The first switch element is coupled between a first power node and a switch node. The second switch element is coupled between the switch node and a second power node. The inductor is coupled between the switch node and an output node. The capacitor is coupled between the output node and the second power node. The current sensor detects a switch current through the second switch element. The current comparator compares the switch current with a first reference current to generate a comparison signal. The controller controls the first switch element and the second switch element according to the comparison signal and a switch voltage at the switch node. The invention can avoid an excessive SMPS output current.

20 Claims, 3 Drawing Sheets

(56) References Cited

U.S. PATENT DOCUMENTS

2011/0096445 A1* 4/2011 Truong .................. H02M 1/32
361/18
2016/0049871 A1* 2/2016 Ihs .......................... H02M 1/32
323/271

OTHER PUBLICATIONS

"TPS544x20 4.5-V to 18-V, 20-A, and 30-A SWIFT™ Synchronous Buck Converters with PMBus™," Datasheet, Texas Instruments, May 2014, (http://www.farnell.com/datasheets/1835709.pdf).*

* cited by examiner

SWITCHED MODE POWER SUPPLY CIRCUIT FOR AVOIDING EXCESSIVE OUTPUT CURRENT

CROSS REFERENCE TO RELATED APPLICATIONS

This application claims the benefit of U.S. Provisional Application No. 62/218,772, filed on Sep. 15, 2015, the entirety of which is incorporated by reference herein.

BACKGROUND OF THE INVENTION

Field of the Invention

The disclosure generally relates to an SMPS (Switched Mode Power Supply) circuit, and more specifically, to an SMPS circuit for avoiding an excessive output current.

Description of the Related Art

A conventional SMPS (Switched Mode Power Supply) circuit is configured to convert a first voltage at an input node into a second voltage at an output node. For some specific applications, the output node of the SMPS circuit is required to be coupled to a very low voltage (close to a ground voltage). Such a low output voltage causes a current imbalance in the SMPS circuit, and an output current through the output node exceeds an acceptable value. The excessive current may melt down a power transistor and destroy the SMPS circuit.

Accordingly, there is a need to design a novel SMPS circuit for solving the problem of the conventional design.

BRIEF SUMMARY OF THE INVENTION

In a preferred embodiment, the disclosure is directed to an SMPS (Switched Mode Power Supply) circuit including a first switch element, a second switch element, an inductor, a capacitor, a current sensor, a current comparator, and a controller. The first switch element is coupled between a first power node and a switch node. The first switch element is closed or opened according to a first control signal. The second switch element is coupled between the switch node and a second power node. The second switch element is closed or opened according to a second control signal. The inductor is coupled between the switch node and an output node. The capacitor is coupled between the output node and the second power node. The current sensor detects a switch current through the second switch element. The current comparator compares the switch current with a first reference current, so as to generate a comparison signal. The controller generates the first control signal and the second control signal according to the comparison signal and a switch voltage at the switch node.

In some embodiments, the first power node has a relatively high voltage, and the second power node has a relatively low voltage.

In some embodiments, the first power node has a supply voltage, and the second power node has a ground voltage.

In some embodiments, when the first switch element is closed and the second switch element is opened, the switch voltage is pulled up to a high logic level. When the first switch element is opened and the second switch element is closed, the switch voltage is pulled down to a low logic level.

In some embodiments, the controller estimates information of the switch voltage by analyzing the first control signal and the second control signal.

In some embodiments, when the switch current is higher than the first reference current, the comparison signal indicates an over current flag.

In some embodiments, the switch voltage includes a plurality of periodic cycles over time axis, and each of the periodic cycles includes a high logic interval and a low logic interval.

In some embodiments, if the switch current is higher than the first reference current, the controller controls the first switch element and the second switch element to decrease duration of the high logic interval and increase duration of the low logic interval.

In some embodiments, if the switch current is higher than the first reference current and the duration of the low logic interval is longer than a threshold value, the controller performs a balancing process to continuously open the first switch element and close the second switch element.

In some embodiments, when the balancing process is performed, the duration of the high logic interval is forced to be zero.

In some embodiments, when the balancing process is performed, the switch current is decreased rapidly.

In some embodiments, when the balancing process is performed, an output current through the output node is decreased rapidly.

In some embodiments, the current comparator further compares the switch current with a second reference current, and the controller keeps performing the balancing process until the switch current is decreased to the second reference current.

In some embodiments, the SMPS circuit further includes a third switch element. The third switch element is coupled between the output node and the second power node. When the balancing process is performed, the controller closes the third switch element so as to form a first bypass current path.

In some embodiments, the SMPS circuit further includes a fourth switch element. The fourth switch element is coupled between the switch node and the output node. When the balancing process is performed, the controller closes the fourth switch element so as to form a second bypass current path.

In some embodiments, the first switch element is implemented with a PMOS transistor (P-type Metal-Oxide-Semiconductor Field-Effect Transistor), and the second switch element is implemented with an NMOS transistor (N-type Metal-Oxide-Semiconductor Field-Effect Transistor).

In some embodiments, the SMPS circuit is a DC-to-DC (Direct Current to Direct Current) converter.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention will be described in detail as follows.

Figure 1:
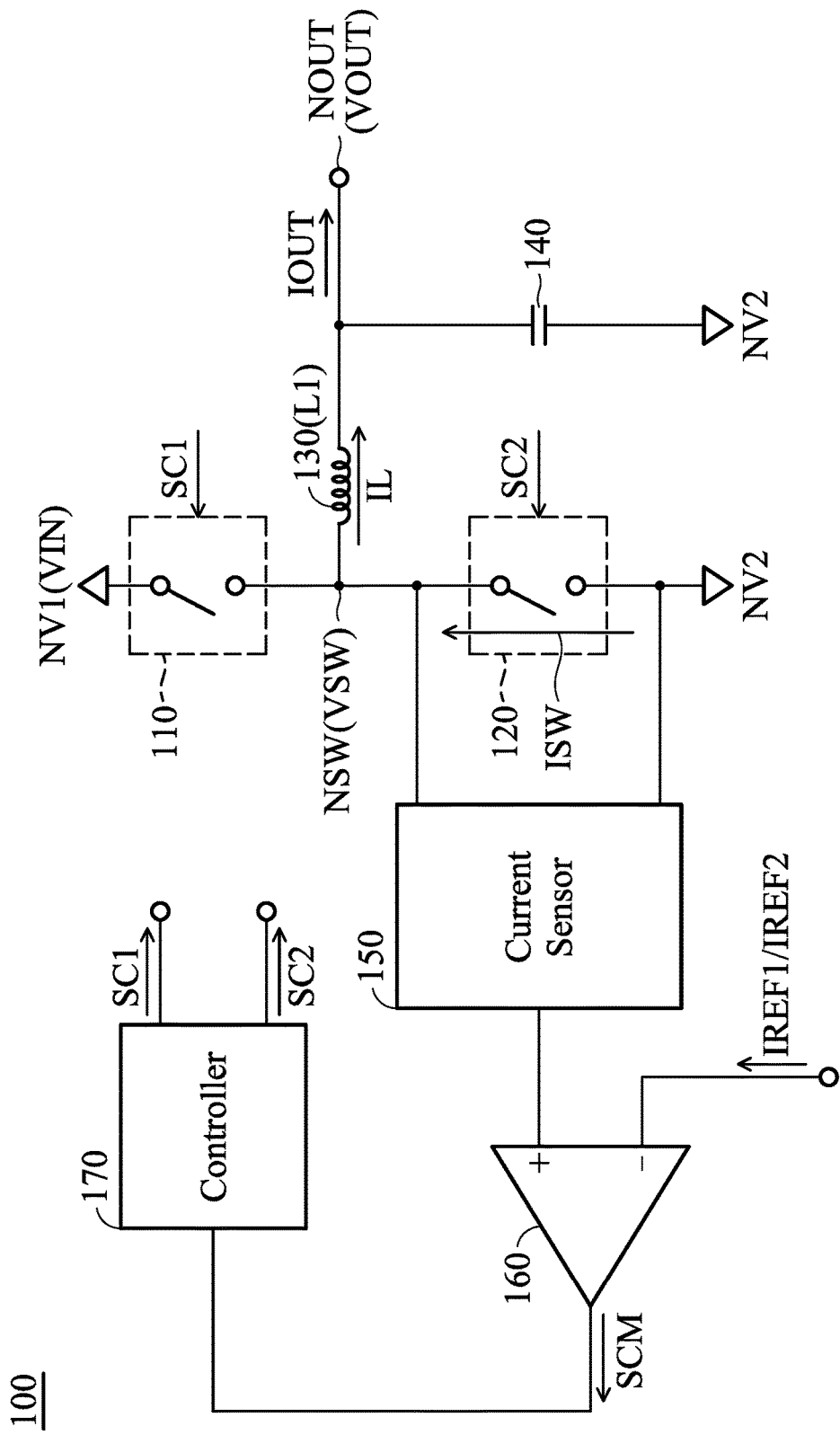
FIG. 1 is a diagram of an SMPS (Switched Mode Power Supply) circuit according to an embodiment of the invention.

FIG. 1 is a diagram of an SMPS (Switched Mode Power Supply) circuit 100 according to an embodiment of the invention. The SMPS circuit 100 may be a DC-to-DC (Direct Current to Direct Current) converter. As shown in FIG. 1, the SMPS circuit 100 includes a first switch element 110, a second switch element 120, an inductor 130, a capacitor 140, a current sensor 150, a current comparator 160, and a controller 170. The SMPS circuit 100 may be applied to a mobile communication device, such as a smartphone, a tablet computer, or a notebook computer.

The first switch element 110 is coupled between a first power node NV1 and a switch node NSW. The first switch element 110 is closed or opened according to a first control signal SC1. The second switch element 120 is coupled between the switch node NSW and a second power node NV2. The second switch element 120 is closed or opened according to a second control signal SC2. The first power node NV1 has a relatively high voltage, and the second power node NV2 has a relatively low voltage. For example, the first power node NV1 may have a supply voltage (VDD, e.g., 4V), and the second power node NV2 may have a ground voltage (VSS, e.g., 0V). In some embodiments, the first switch element 110 is implemented with a PMOS transistor (P-type Metal-Oxide-Semiconductor Field-Effect Transistor), and the second switch element 120 is implemented with an NMOS transistor (N-type Metal-Oxide-Semiconductor Field-Effect Transistor). The PMOS transistor may have a control terminal for receiving the first control signal SC1, a first terminal coupled to the first power node NV1, and a second terminal coupled to the switch node NSW. The NMOS transistor may have a control terminal for receiving the second control signal SC2, a first terminal coupled to the second power node NV2, and a second terminal coupled to the switch node NSW.

The inductor 130 is coupled between the switch node NSW and an output node NOUT. The capacitor 140 is coupled between the output node NOUT and the second power node NV2. A low-pass filter is formed by the inductor 130 and the capacitor 140. In some embodiments, the first switch element 110 and the second switch element 120 are complementary. That is, if one of the first switch element 110 and the second switch element 120 is closed (opened), the other of the first switch element 110 and the second switch element 120 will be opened (closed). The first switch element 110 and the second switch element 120 may be closed and opened alternatively. Specifically, when the first switch element 110 is closed and the second switch element 120 is opened, a switch voltage VSW at the switch node NSW may be pulled up by the first power node NV1 to a high logic level (e.g., a logic level "1"); and when the first switch element 110 is opened and the second switch element 120 is closed, the switch voltage VSW at the switch node NSW may be pulled down by the second power node NV2 to a low logic level (e.g., a logic level "0"). As a result, the switch voltage VSW at the switch node NSW may have a square waveform over a time axis. The square waveform of the switch voltage VSW may include periodic cycles over the time axis, and each of the periodic cycles may include a high logic interval and a low logic interval. The switch voltage VSW with the square waveform may be further processed by the low-pass filter, such that a DC output voltage VOUT may be generated at the output node NOUT. The DC output voltage VOUT is between the voltage at the first power node NV1 and the voltage at the second power node NV2. For example, if the first power node NV1 has a voltage of 4V and the second power node NV2 has a voltage of 0V, the DC output voltage VOUT at the output node NOUT may have a voltage ranging from 0V to 4V (e.g., 2V).

The current sensor 150 may have a first input terminal coupled to the switch node NSW, a second input terminal coupled to the second power node NV2, and an output terminal. The current sensor 150 is configured to detect a switch current ISW which flows through the second switch element 120. The current comparator 160 may have a positive input terminal coupled to the output terminal of the current sensor 150, a negative input terminal for receiving a first reference current IREF1 (or a second reference current IREF2, introduced in the following embodiments), and an output terminal for outputting a comparison signal SCM. The current comparator 160 is configured to compare the switch current ISW with the first reference current IREF1, so as to generate the comparison signal SCM. For example, when the switch current ISW is higher than the first reference current IREF1, the comparison signal SCM may rise to a high logic level, so as to indicate an over current flag; otherwise, the comparison signal SCM may be at a low logic level.

The controller 170 is configured to generate the first control signal SC1 for controlling the first switch element 110 and the second control signal SC2 for controlling the second switch element 120, according to the comparison signal SCM and the switch voltage VSW. In some embodiments, the controller 170 is not coupled to the switch node NSW, and it estimates the information of the switch voltage VSW by analyzing the first control signal SC1 and the second control signal SC2 (because the switch voltage VSW is determined according to the first control signal SC1 and the second control signal SC2). In alternative embodiments, the controller 170 has an additional signal path which is directly connected to the switch node NSW, so as to retrieve the information of the switch voltage VSW from the switch node NSW. Generally, the controller 170 may be operated as follows. If the switch current ISW is higher than the first reference current IREF1, the controller 170 can control the first switch element 110 and the second switch element 120 to decrease the duration of the high logic interval of the switch voltage VSW and to increase the duration of the low logic interval of the switch voltage VSW. Furthermore, if the switch current ISW is higher than the first reference current IREF1 and the duration of the low logic interval of the switch voltage VSW is longer than a threshold value, the controller 170 can perform a balancing process to continuously open the first switch element 110 and close the second switch element 120. The above operations of the controller 170 are used to avoid an excessive output current IOUT through the output node NOUT. Please refer to the detailed descriptions in the following embodiments.

Figure 2:
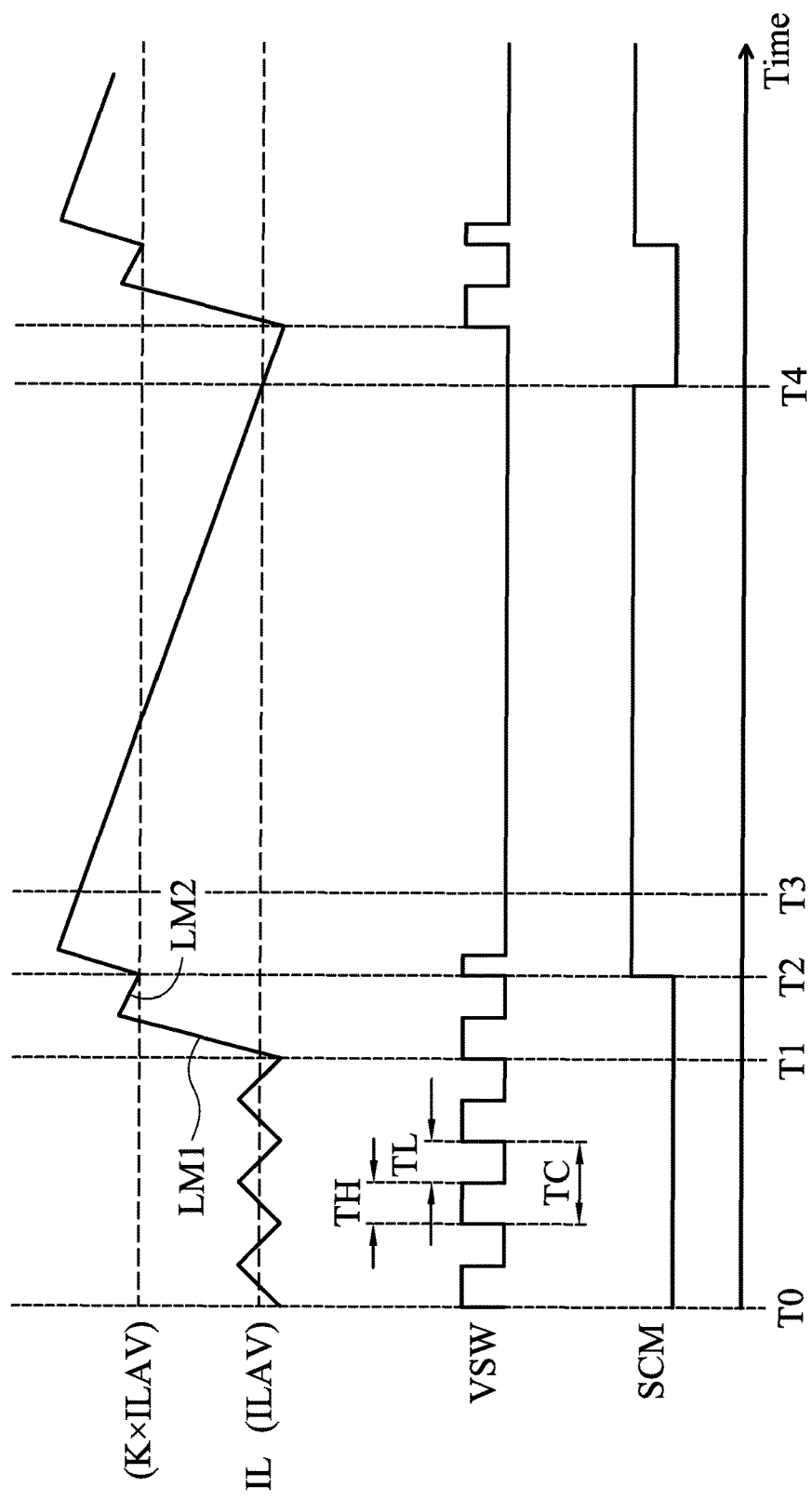
FIG. 2 is a diagram of signal waveforms of an SMPS circuit according to an embodiment of the invention.

FIG. 2 is a diagram of signal waveforms of the SMPS circuit 100 according to an embodiment of the invention. The horizontal axis represents a time axis, and the vertical axis represents a respective level of each signal.

From an initial time point T0 to a first time point T1, the SMPS circuit 100 is operated as a DC-to-DC converter normally. Generally, an input voltage VIN (e.g., 4V) at the first power node NV1 can be converted into an output voltage VOUT (e.g., 2V) at the output node NOUT. The switch voltage VSW at the switch node NSW has a square waveform and includes periodic cycles TC, and each of the periodic cycles TC includes a high logic interval TH and a low logic interval TL. The duration of the high logic interval TH is substantially equal to the duration of the low logic interval TL (i.e., a 50% duty cycle). In each high logic interval TH, a pulling-up current path is formed from the first power node NV1 through the closed first switch element 110 to the switch node NSW, and a inductor current IL which flows through the inductor 130 gradually increases. In each low logic interval TL, a pulling-down current path is formed from the second power node NV2 through the closed second switch element 120 to the switch node NSW, and the inductor current IL which flows through the inductor 130 gradually decreases. It should be noted that the switch current ISW, the inductor current IL, and the output current IOUT are highly correlated with each other. Even if only the switch current ISW is detected by the current sensor 150, the information of the inductor current IL and the output current IOUT can be analyzed and estimated according to the information of the switch current ISW. The inductor current IL has an average value ILAV, and it substantially fluctuates up and down around the average value ILAV.

At the first time point T1, the output node NOUT of the SNIPS circuit 100 is coupled to a very low voltage (close to a ground voltage). As a result, from the first time point T1 to a second time point T2, the inductor current IL suddenly increases and then reaches a threshold value K×ILAV (e.g., K may be greater than 1, such as 1.2 or 1.4), it also causes the switch current ISW through the second switch element 120 to increase and then reach the first reference current IREF1. Please refer to the following equations (1) and (2) to understand its operation theory.

$$LM1 = (VIN - VOUT)/L1 \quad (1)$$

$$LM2 = (VOUT)/L1 \quad (2)$$

where LM1 represents the slope of the inductor current IL (current over time) in the high logic interval TH, LM2 represents the slope of the inductor current IL (current over time) in the low logic interval TL, VIN represents the voltage at the first power node NV1, VOUT represents the voltage at the output node NOUT, and L1 represents the inductance of the inductor 130.

If the voltage at the output node NOUT is forced to be set close to zero, the slope LM2 of the inductor current IL in the low logic interval TL will approach zero, and conversely, the slope LM1 of the inductor current IL in the high logic interval TH will become very high. The above unbalanced slopes LM1 and LM2 can significantly increase the switch current ISW, the inductor current IL, and the output current IOUT.

At the second time point T2, the current comparator 150 outputs the comparison signal SCM which indicates an over current flag because the switch current ISW is higher than the first reference current IREF1. As a result, from the second time point T2 to a third time point T3, the controller 170 starts to decrease the duration of the high logic interval TH and to increase the duration of the low logic interval TL (i.e., a duty cycle less than 50%). Such an operation can enhance the pulling-down current path and weaken the pulling-up current path, so as to limit the inductor current IL and the output current IOUT.

At the third time point T3, the duration of the low logic interval TL increases and reaches a threshold value. The threshold value may be equal to or less than a maximum value of the duration of the low logic interval TL. The controller 170 may include a time comparator for comparing the duration of the low logic interval TL with the threshold value. If the switch current ISW is higher than the first reference current IREF1 and the duration of the low logic interval TL is longer than the threshold value, from the third time point T3 to a fourth time point T4, the controller 170 can perform a balancing process. In some embodiments, when the balancing process is performed, the duration of the high logic interval TH is forced to be zero (by continuously opening the first switch element 110 and closing the second switch element 120), and each periodic cycle TC includes only the low logic interval TL. Since there is only a pulling-down current path and no pulling-up current path coupled to the switch node NSW, the balancing process can rapidly decrease the switch current ISW, the inductor current IL, and the output current IOUT. In some embodiments, during the balancing process, the negative input terminal of the current comparator 160 is reset to a second reference current IREF2, which is lower than the first reference current IREF1, and the current comparator 160 is further configured to compare the switch current ISW with the second reference current IREF2. When inductor current IL decreases and reaches the average value ILAV, it also causes the switch current ISW through the second switch element 120 to decrease and reach the second reference current IREF2, such that the comparison signal SCM stops indicating the over current flag. The balancing process is terminated at the fourth time point T4 because no over current flag is detected. In other words, after the duration of the low logic interval TL becomes longer than the threshold value, the controller 170 keeps performing the balancing process until the switch current ISW is decreased to the second reference current IREF2 (i.e., until the inductor current IL decreases back to the average value ILAV). The above operations of the controller 170 guarantee that the output current IOUT will not exceed an acceptable value and the SMPS circuit 100 will not be damaged.

For example, the time parameters of the SMPS circuit 100 may be set as follows. It should be noted these parameter are just exemplary for the reader to easily understand the operation theory of the invention, rather than limitation of the invention. From the initial time point T0 to the second time point T2, the duration of the low logic interval TL may be 5 ns, and the duration of the high logic interval TH may be also 5 ns. Then, the over current flag is triggered at the second time point T2. From the second time point T2 to the third time point T3, the duration of the low logic interval TL may be gradually increased, and the duration of the high logic interval TH may be gradually decreased. Next, the duration of the low logic interval TL reaches a threshold value, such as 8.5 ns, at the third time point T3, and the balancing process is performed accordingly. The threshold value may be equal to or less than a maximum value (e.g., 9 ns) of the duration of the low logic interval TL. From the third time point T3 to the fourth time point T4, during the balancing process, the duration of the low logic interval TL is forced to be 10 ns (5 ns+5 ns), and the duration of the high logic interval TH is forced to be 0 ns.

Figure 3:
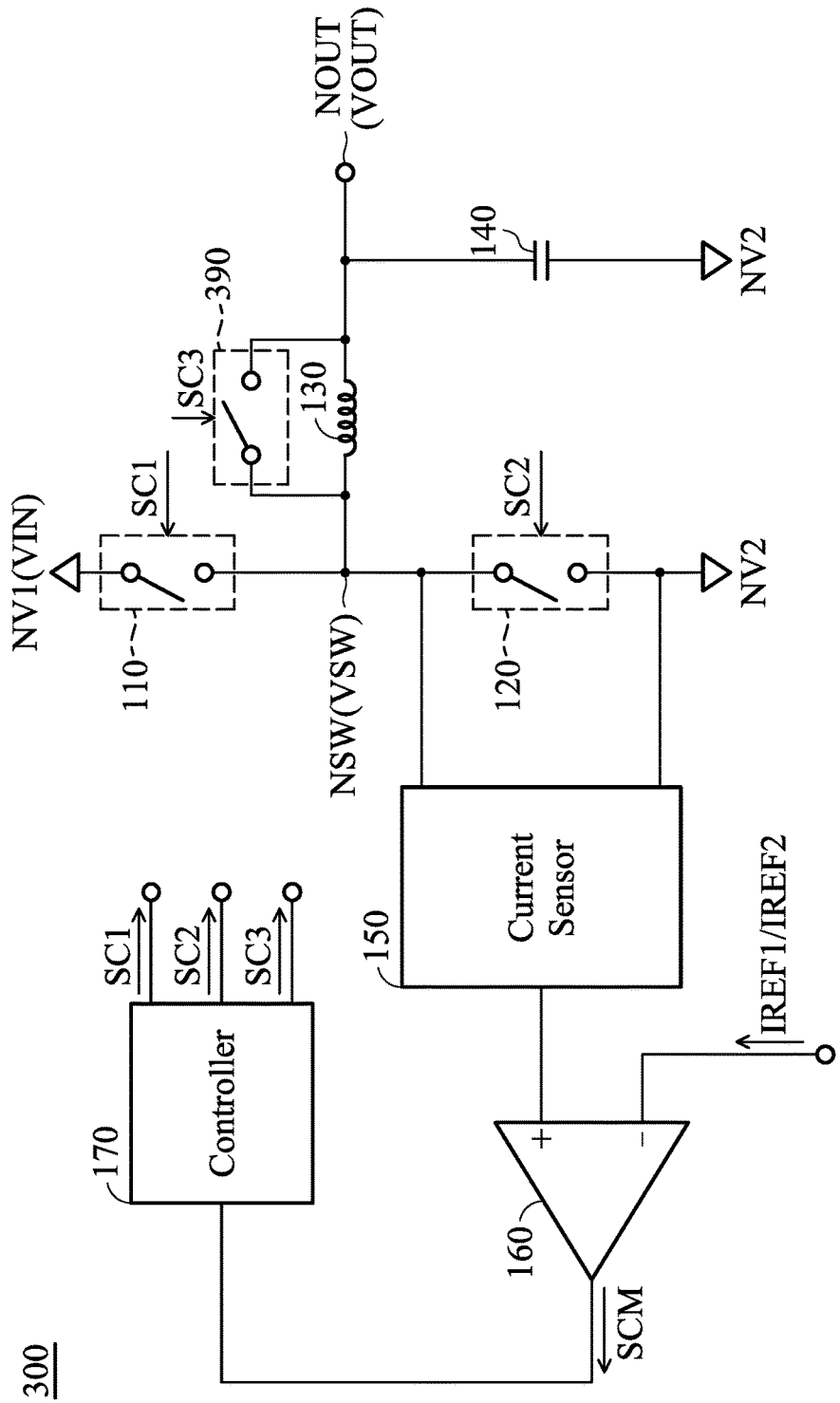
FIG. 3 is a diagram of an SMPS circuit according to an embodiment of the invention.

FIG. 3 is a diagram of an SMPS circuit 300 according to an embodiment of the invention. FIG. 3 is similar to FIG. 1. In the embodiment of FIG. 3, the SMPS circuit 300 further includes a third switch element 390. The third switch element 390 is coupled between the switch node NSW and the output node NOUT. The controller 170 is further configured to generate a third control signal SC3, and the third switch element 390 is closed or opened according to the third control signal SC3. When the balancing process is performed, the controller 170 closes the third switch element 390 so as to form a bypass current path and meanwhile opens the second switch element 120. The bypass current path is used as an auxiliary pulling-down current path for decreasing the inductor current IL and the output current IOUT. Other features of the SMPS circuit 300 of FIG. 3 are similar to those of the SMPS circuit 100 of FIG. 1. Accordingly, the two embodiments can achieve similar levels of performance.

The invention proposes a solution for avoiding an excessive output current through an output node of an SMPS circuit. In some embodiments, a current sensor is coupled to a pulling-down current path of the SMPS circuit, and configured to detect a switch current through the pulling-down current path. A switch voltage at a switch node between the pulling-down current path and a pulling-up current path of the SMPS circuit has periodic cycles over time axis, and each of the periodic cycles includes a high logic interval and a low logic interval. Since the duration of the low logic interval is relatively long and easily to be detected, the above arrangement of the current sensor can reduce the circuit complexity of the SMPS circuit. In some embodiments, a balancing process is performed to continuously disable the pulling-up current path and enable the pulling-down current path when the switch current is higher than a reference current and the duration of the low logic interval is longer than a threshold value. The balancing process can rapidly decrease the output current, and effectively prevent the SMPS circuit from being damaged.

The above parameters, such as the values of voltages or currents, are just exemplary, rather than limitations of the invention. Designers can fine tune these parameters in response to different requirements. It is understood that the SMPS circuit is not limited to the configurations of FIGS. 1-3. The invention may merely include any one or more features of any one or more embodiments of FIGS. 1-3. In other words, not all of the features shown in the figures should be implemented in the SMPS circuit of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An SMPS (Switched Mode Power Supply) circuit, comprising:
    a first switch element, coupled between a first power node and a switch node, wherein the first switch element is closed or opened according to a first control signal;
    a second switch element, coupled between the switch node and a second power node, wherein the second switch element is closed or opened according to a second control signal;
    an inductor, coupled between the switch node and an output node;
    a capacitor, coupled between the output node and the second power node;
    a current sensor, detecting a switch current through the second switch element;
    a current comparator, comparing the switch current with a first reference current, so as to generate a comparison signal; and
    a controller, generating the first control signal and the second control signal according to the comparison signal and a switch voltage at the switch node;
    wherein the current sensor has a first input terminal coupled to the switch node, a second input terminal coupled to the second power node, and an output terminal;
    wherein the current comparator has a positive input terminal coupled to the output terminal of the current sensor, a negative input terminal for receiving the first reference current, and an output terminal for outputting the comparison signal,
    wherein the switch voltage comprises a plurality of periodic cycles over time, and each of the periodic cycles comprises a high logic interval and a low logic interval,
    wherein if the switch current is higher than the first reference current, the controller controls the first switch element and the second switch element to decrease a duration of the high logic interval and increase a duration of the low logic interval,
    wherein if the switch current is higher than the first reference current and the duration of the low logic interval is longer than a threshold value, the controller performs a balancing process to continuously open the first switch element and close the second switch element, and
    wherein the current comparator further compares the switch current with a second reference current, and the controller keeps performing the balancing process until the switch current is decreased to the second reference current.

2. The SMPS circuit as claimed in claim 1, wherein the first power node has a relatively high voltage, and the second power node has a relatively low voltage.

3. The SMPS circuit as claimed in claim 1, wherein the first power node has a supply voltage, and the second power node has a ground voltage.

4. The SMPS circuit as claimed in claim 1, wherein when the first switch element is closed and the second switch element is opened, the switch voltage is pulled up to a high logic level, wherein when the first switch element is opened and the second switch element is closed, the switch voltage is pulled down to a low logic level.

5. The SMPS circuit as claimed in claim 1, wherein the controller estimates information of the switch voltage by analyzing the first control signal and the second control signal.

6. The SMPS circuit as claimed in claim 1, wherein when the switch current is higher than the first reference current, the comparison signal indicates an over current flag.

7. The SMPS circuit as claimed in claim 1, wherein when the balancing process is performed, the duration of the high logic interval is forced to be zero.

8. The SMPS circuit as claimed in claim 1, wherein when the balancing process is performed, the switch current is decreased more rapidly.

9. The SMPS circuit as claimed in claim 1, wherein when the balancing process is performed, an output current through the output node is decreased more rapidly.

10. The SMPS circuit as claimed in claim 1, wherein the first switch element is implemented with a PMOS transistor (P-type Metal-Oxide-Semiconductor Field-Effect Transistor), and the second switch element is implemented with an NMOS transistor (N-type Metal-Oxide-Semiconductor Field-Effect Transistor).

11. The SMPS circuit as claimed in claim 1, wherein the SMPS circuit is a DC-to-DC (Direct Current to Direct Current) converter.

12. An SMPS (Switched Mode Power Supply) circuit, comprising:
a first switch element, coupled between a first power node and a switch node, wherein the first switch element is closed or opened according to a first control signal;
a second switch element, coupled between the switch node and a second power node, wherein the second switch element is closed or opened according to a second control signal;
an inductor, coupled between the switch node and an output node;
a capacitor, coupled between the output node and the second power node;
a current sensor, detecting a switch current through the second switch element;
a current comparator, comparing the switch current with a first reference current, so as to generate a comparison signal; and
a controller, generating the first control signal and the second control signal according to the comparison signal and a switch voltage at the switch node;
wherein the current sensor has a first input terminal coupled to the switch node, a second input terminal coupled to the second power node, and an output terminal;
wherein the current comparator has a positive input terminal coupled to the output terminal of the current sensor, a negative input terminal for receiving the first reference current, and an output terminal for outputting the comparison signal,
wherein the switch voltage comprises a plurality of periodic cycles over time, and each of the periodic cycles comprises a high logic interval and a low logic interval,
wherein if the switch current is higher than the first reference current, the controller controls the first switch element and the second switch element to decrease a duration of the high logic interval and increase a duration of the low logic interval, and
wherein if the switch current is higher than the first reference current and the duration of the low logic interval is longer than a threshold value, the controller performs a balancing process to continuously open the first switch element and close the second switch element, and wherein the SMPS circuit further comprises:
a third switch element, coupled between the switch node and the output node, wherein when the balancing process is performed, the controller closes the third switch element so as to form a bypass current path.

13. The SMPS circuit as claimed in claim 12, wherein the first power node has a relatively high voltage, and the second power node has a relatively low voltage.

14. The SMPS circuit as claimed in claim 12, wherein the first power node has a supply voltage, and the second power node has a ground voltage.

15. The SMPS circuit as claimed in claim 12, wherein when the first switch element is closed and the second switch element is opened, the switch voltage is pulled up to a high logic level, wherein when the first switch element is opened and the second switch element is closed, the switch voltage is pulled down to a low logic level.

16. The SMPS circuit as claimed in claim 12, wherein the controller estimates information of the switch voltage by analyzing the first control signal and the second control signal.

17. The SMPS circuit as claimed in claim 12, wherein when the switch current is higher than the first reference current, the comparison signal indicates an over current flag.

18. The SMPS circuit as claimed in claim 12, wherein when the balancing process is performed, the duration of the high logic interval is forced to be zero.

19. The SMPS circuit as claimed in claim 12, wherein the first switch element is implemented with a PMOS transistor (P-type Metal-Oxide-Semiconductor Field-Effect Transistor), and the second switch element is implemented with an NMOS transistor (N-type Metal-Oxide-Semiconductor Field-Effect Transistor).

20. The SMPS circuit as claimed in claim 12, wherein the SMPS circuit is a DC-to-DC (Direct Current to Direct Current) converter.

* * * * *